US011169517B2

(12) United States Patent
Lavoie et al.

(10) Patent No.: US 11,169,517 B2
(45) Date of Patent: Nov. 9, 2021

(54) INITIATION OF VEHICLE REMOTE PARK-ASSIST WITH KEY FOB

(71) Applicant: Ford Global Technologies, LLC, Dearborn, MI (US)

(72) Inventors: Erick Michael Lavoie, Dearborn, MI (US); John Robert Van Wiemeersch, Novi, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 16/372,330

(22) Filed: Apr. 1, 2019

(65) Prior Publication Data
US 2020/0310406 A1   Oct. 1, 2020

(51) Int. Cl.
*G05D 1/00* (2006.01)
*B62D 15/02* (2006.01)
*B60J 3/04* (2006.01)

(52) U.S. Cl.
CPC ............. *G05D 1/0016* (2013.01); *B60J 3/04* (2013.01); *B62D 15/029* (2013.01); *G05D 1/0022* (2013.01)

(58) Field of Classification Search
CPC .................................................. G05D 1/0016
See application file for complete search history.

(56) References Cited

U.S. PATENT DOCUMENTS

| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |

(Continued)

FOREIGN PATENT DOCUMENTS

| CN | 104290751 B | 1/1918 |
| CN | 101929921 A | 12/2010 |

(Continued)

OTHER PUBLICATIONS

US 9,772,406 B2, 09/2017, Liu (withdrawn)

(Continued)

*Primary Examiner* — Anne Marie Antonucci
*Assistant Examiner* — Abdalla A Khaled
(74) *Attorney, Agent, or Firm* — Frank Lollo; Eversheds Sutherland (US) LLP

(57) ABSTRACT

Method and apparatus are disclosed for initiation of vehicle remote park-assist with key fob. An example vehicle includes a cabin, a human-machine interface (HMI) unit located in the cabin, and a receiver-transceiver module. The receiver-transceiver module is configured to receive a return signal including a distance indicator from a key fob and a remote park-assist (RePA) signal. The example vehicle also includes an autonomy unit configured to perform RePA based on the RePA signal. The example vehicle also includes a controller configured to receive, via the HMI unit, selections to activate RePA and utilize the key fob for transmitting the RePA signal and determine, based on the distance indicator, whether the key fob is in the cabin. The controller also is configured to, responsive to determining that the key fob is in the cabin, prevent the autonomy unit from performing RePA.

18 Claims, 8 Drawing Sheets

(56) References Cited

U.S. PATENT DOCUMENTS

| | | |
|---|---|---|
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang et al. |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler et al. |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling et al. |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch et al. |
| 9,845,070 B2 | 12/2017 | Petel et al. |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters et al. |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0027759 A1* | 1/2009 | Albahri .............. E06B 9/24 |
| | | 359/277 |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |

(56) References Cited

U.S. PATENT DOCUMENTS

| | | |
|---|---|---|
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1* | 3/2015 | Bonnet ................ B60W 30/06 701/23 |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |

(56) References Cited

U.S. PATENT DOCUMENTS

| | | |
|---|---|---|
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne et al. |
| 2017/0308075 A1 | 10/2017 | Whitaker et al. |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner et al. |
| 2018/0043884 A1 | 2/2018 | Johnson |
| 2018/0056939 A1 | 3/2018 | Van Roermund et al. |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0170242 A1* | 6/2018 | Wang .................. H04L 67/125 |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1* | 8/2018 | Nam .................. B60R 21/00 |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0204821 A1* | 7/2019 | Yoon .................. B62D 15/0285 |
| 2020/0249668 A1* | 8/2020 | Woodruff, III ... H02J 13/00022 |
| 2020/0310410 A1* | 10/2020 | Noguchi .................. B60N 2/002 |

FOREIGN PATENT DOCUMENTS

| | | |
|---|---|---|
| CN | 103818204 A | 5/2014 |
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102010034129 B4 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016134822 A1 | 9/2016 |
| WO | WO 2016/046269 A1 | 4/2017 |
| WO | WO 2016/128200 A1 | 5/2017 |
| WO | WO 2017/062448 A1 | 6/2017 |
| WO | WO 2017/073159 A1 | 6/2017 |
| WO | WO 2017/096307 A1 | 6/2017 |

(56) References Cited

FOREIGN PATENT DOCUMENTS

| WO | WO 2017/096728 A1 | 7/2017 |
| WO | WO 2017/097942 A1 | 7/2017 |

OTHER PUBLICATIONS

Tesla, *Model S Owner's Manual*, Aug. 10, 2018, 197 pages.
Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes- benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Vehicle'S Orientation Measurement Method by Single-Camera Image Using Known-Shaped Planar Object, Nozomu Araki, Takao Sato, Yasuo Konishi and Hiroyuki Ishigaki, 2010.

\* cited by examiner

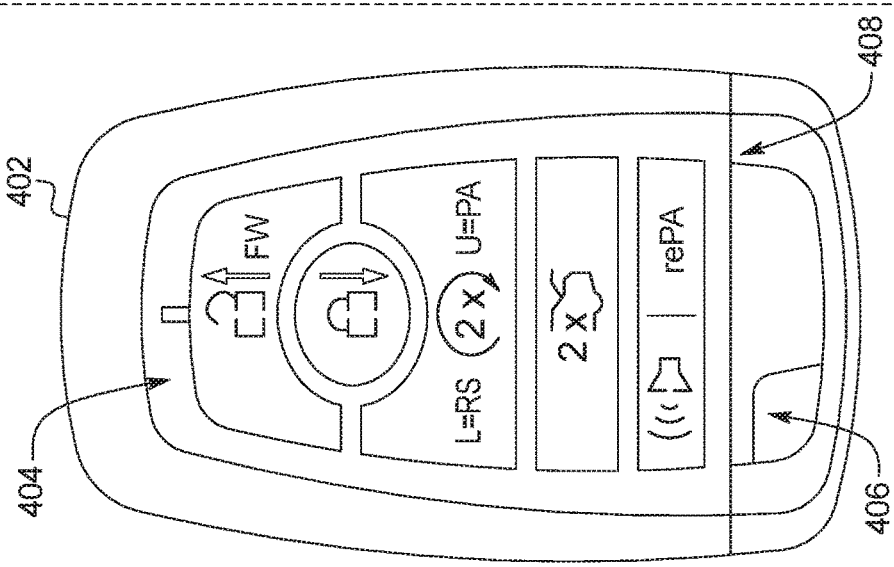

REMOTE START = Press LOCK button, then push "2X" button twice within 3 seconds of pushing LOCK.

Enter RePA MODE = Press UNLOCK button, then push "2X" button twice within 3 seconds of pushing UNLOCK.

rePA FORWARD = Hold PANIC button, then hold UNLOCK button simultaneously with panic button. Release either button to stop vehicle motion. Release UNLOCK button first to stop vehicle motion smoothly.

rePA REVERSE = Hold PANIC button, then hold LOCK button simultaneously with panic button. Release either button to stop vehicle motion. Release LOCK button first to stop vehicle motion smoothly.

Exit RePA / Stop Quickly = Release all buttons, then press "2X" TRUNK button.

FIG. 4

INITIATION OF VEHICLE REMOTE PARK-ASSIST WITH KEY FOB

CROSS-REFERENCE TO RELATED APPLICATIONS

This application is related to U.S. application Ser. No. 16/372,335, filed on Apr. 1, 2019, and U.S. application Ser. No. 16/372,340, filed on Apr. 1, 2019, which are incorporated herein by reference in their entireties.

TECHNICAL FIELD

The present disclosure generally relates to park-assist and, more specifically, to initiation of vehicle remote park-assist with key fob.

BACKGROUND

Many vehicles include functions in which at least some motive functions of a vehicle are autonomously controlled by the vehicle. For instance, some vehicles include cruise control in which the vehicle controls acceleration and/or deceleration of the vehicle so that a speed of the vehicle is maintained. Further, some vehicles include park-assist features in which the vehicle autonomously and/or semi-autonomously controls motive functions of the vehicle to park the vehicle into a parking spot. For instance, some vehicles include a remote park-assist system that enables a user to initiate park-assist features from a remote location.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for initiation of vehicle remote park-assist with key fob. An example disclosed vehicle includes a cabin, a human-machine interface (HMI) unit located in the cabin, and a receiver-transceiver module. The receiver-transceiver module is configured to receive a return signal including a distance indicator from a key fob and a remote park-assist (RePA) signal. The example disclosed vehicle also includes an autonomy unit configured to perform RePA based on the RePA signal. The example disclosed vehicle also includes a controller configured to receive, via the HMI unit, selections to activate RePA and utilize the key fob for transmitting the RePA signal and determine, based on the distance indicator, whether the key fob is in the cabin. The controller also is configured to, responsive to determining that the key fob is in the cabin, prevent the autonomy unit from performing RePA.

An example disclosed method for initiating remote park-assist (RePA) for a vehicle includes receiving, via a human-machine interface (HMI) unit located in a cabin, selections to activate RePA and utilize a key fob for transmitting a RePA signal. The example disclosed method also includes receiving, via a receiver-transceiver module, a return signal from the key fob and identifying, via a processor, a distance indicator within the return signal. The example disclosed method also includes determining, via the processor, whether the key fob is in the cabin based on the distance indicator and preventing an autonomy unit from performing RePA responsive to determining that the key fob is in the cabin.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 4 depicts an interface presented via a display of the vehicle of FIG. 1.

DETAILED DESCRIPTION OF EXAMPLE EMBODIMENTS

Figure 1:
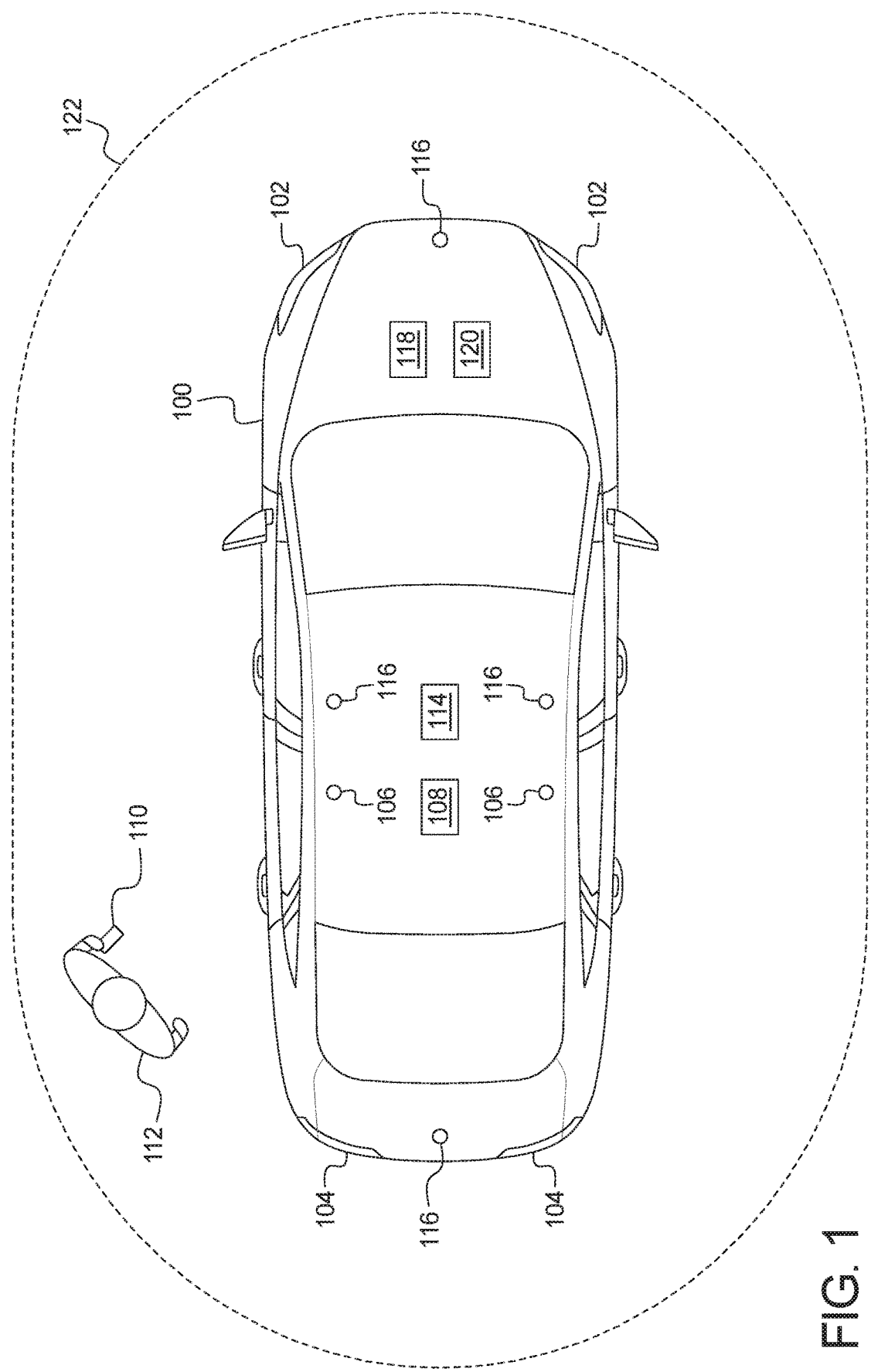
FIG. 1 illustrates a vehicle and a key fob in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For instance, some vehicles include cruise control in which the vehicle controls acceleration and/or deceleration of the vehicle so that a speed of the vehicle is maintained. Further, some vehicles include park-assist features in which the vehicle autonomously and/or semi-autonomously controls motive functions of the vehicle to park the vehicle into a parking spot. For instance, some vehicles include a remote park-assist system that enables a user to initiate park-assist features from a remote location.

Some remote park-assist systems use both a key fob and a mobile device (a smart phone, a wearable, a smart watch, a tablet, etc.) carried by a user of the vehicle. In some instances, the remote park-assist system uses the key fob to localize and/or determine a distance to the user relative to the vehicle and uses the mobile device to send signals to initiate park-assist motive functions of the vehicle. For instance, the key fob may potentially be used for accurately determining a distance between the user and the vehicle based on low-frequency communication. Further, the mobile device may potentially be used to initiate the park-assist motive functions to facilitate the simultaneous localization of the user and sending of park-assist instructions. An example remote park-assist system that utilizes both a key fob and a mobile device carried by a user of a vehicle is disclosed in further detail in U.S. application Ser. No. 15/948,428, filed on Apr. 9, 2018, which is incorporated by reference in its entirety. In some such instances, the mobile device potentially may be unavailable for remote park-assist use. For instance, the mobile device may have been misplaced by the user and/or have a discharged battery. Further, some users potentially may find it burdensome to carry two devices, namely the key fob and the mobile device, to initiate remote park-assist for a vehicle.

Example methods and apparatus disclosed herein include a remote park-assist (RePA) system that enables a key fob to be used for both the localization of a user and the sending of signals to initiate park-assist motive functions. The RePA system is configured to be activated by a user via a human-machine interface (e.g., a touchscreen) within a cabin of the vehicle. Further, the RePA system enables the user to select, via the human-machine interface, which remote device, namely a mobile device (e.g., a smart phone, a wearable, a smart watch, a tablet, etc.) or a key fob, is to be utilized for sending RePA signals to the vehicle. If the user selects the key fob via the human-machine interface, the human-machine interface presents instructions to the user for sending RePA signals to the vehicle via the key fob. In some examples, the human-machine interface presents an interface that enables the user to designate or assign vehicle features to corresponding combinations of buttons of the key fob. For example, the user may assign a certain combination of buttons to perform a frequently used RePA maneuver, designate settings for a maneuver, and/or change how to command basic vehicle movements such as forward and reverse. Further, in some examples, the human-machine interface presents instructions to the user for selecting which buttons of the key fob to choose when assigning simultaneous button presses or a sequence of button presses for a corresponding RePA function. Additionally, or alternatively, the RePA system (1) enables RePA to be performed in response to determining that the key fob is located outside of the vehicle cabin and (2) prevents RePA from being performed in response to determining that the key fob is located within the vehicle cabin. Further, in some examples, the RePA system emits an alert to the user (e.g., via headlamps, tail lamps, horns, accent lamps, key fob LEDs, etc.) based on a current status signal of RePA.

As used herein, a "key fob" refers to a dedicated electronic remote device that wirelessly communicates with a vehicle to unlock and/or lock vehicle door(s), unlatch the vehicle door(s), open and/or close the vehicle door(s), activate an engine of the vehicle, and/or control other function(s) of the vehicle. As used herein, a "mobile device" refers to an electronic remote device that is configured to (1) wirelessly communicate with a vehicle to control vehicle function(s) and (2) wirelessly communicate with other device(s) to control non-vehicle-related functions. Example mobile devices include a smart phone, a wearable, a smart watch, a tablet, etc.

As used herein, "vehicle park-assist" and "park-assist" refer to a system in which a vehicle controls its motive functions, without direct steering or velocity input from an operator (e.g., a driver), to autonomously park within a parking spot. For example, an autonomy unit of a park-assist system controls the motive functions of the vehicle upon receiving an initiation signal from the operator. As used herein, "remote parking," "vehicle remote park-assist," "remote park-assist," and "RePA" refer to a system in which a vehicle controls its motive functions, without direct steering or velocity input from an operator (e.g., a driver), to autonomously park within a parking spot while the operator is located outside of the vehicle. For example, an autonomy unit of a remote park-assist system controls the motive functions of the vehicle upon receiving a remote initiation signal from a mobile device of the operator.

As used herein, "remote entry," "remote keyless entry," and "RKE" refer to a vehicle system that unlocks and/or opens one or more doors of a vehicle in response to receiving a signal to do so from an authorized remote device (e.g., a key fob, a mobile device). As used herein, "remote start" refers to a vehicle system that starts or activates an engine of a vehicle in response to receiving a signal to do so from an authorized remote device (e.g., a key fob, a mobile device).

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) and/or autonomous (e.g., motive functions are controlled by the vehicle 100 without direct driver input).

In the illustrated example, the vehicle 100 includes headlamps 102 located at a front of the vehicle 100 and tail lamps 104 located at a rear of the vehicle 100. When activated, the headlamps 102 emit headlights that illuminate a portion of a road in front of the vehicle 100 to enable a vehicle operator (e.g., a driver) to see in front of the vehicle 100 in low-light conditions (e.g., nighttime). In some examples, each of the headlamps 102 includes (i) a low-beam headlamp to illuminate a side of a road along which the vehicle 100 is travelling and (ii) a high-beam headlamp to illuminate a greater portion of the road. Further, the tail lamps 104 are activated to warn others when the vehicle 100 is braking, turning, etc. Additionally, or alternatively, the headlamps 102 and tail lamps 104 are activated to facilitate another vehicle (e.g., a trailing vehicle, an oncoming vehicle, etc.) to view the vehicle 100 in low-light conditions.

Further, the vehicle of the illustrated example includes one or more low frequency (LF) modules 106 and a receiver-transceiver module 108. Each of the LF modules 106 and the receiver-transceiver module 108 includes hardware (e.g., processors, memory, storage, antenna, etc.) and software to control wireless network interfaces. For example, the LF modules 106 include hardware and software to communicate via LF signals (e.g., 125 kHz to 134.5 kHz, etc.), and the receiver-transceiver module 108 include hardware and software to communicate via ultra-high frequency (UHF) signals and/or other medium-frequency signals (e.g., 314 MHz to 904 MHz, etc.). As disclosed below in greater detail below, the LF modules 106 and the receiver-transceiver module 108 are configured to wirelessly communicate with a key fob 110 of a user 112 to determine a distance between the key fob 110 and the vehicle 100.

Further, in the illustrated example, the vehicle 100 of the illustrated example includes a communication module 114 and antenna modules 116 that are configured for wireless communication with the key fob 110 of the user 112. For example, the key fob 110 and/or a mobile device (a smart phone, a wearable, a smart watch, a tablet, etc.) is configured to communicate with the communication module 114 and antenna modules 116 to initiate vehicle functions, such as passive entry, passive start, remote entry, remote start, remote park-assist, etc. Further, in some examples, the communication module 114 and the antenna modules 116 are configured to localize the key fob 110 for initiation of one or more of the vehicle function(s).

The antenna modules 116 include hardware (e.g., processors, memory, storage, antenna, etc.) and software to control wireless network interface(s). For example, the antenna modules 116 are configured for personal or local area wireless network protocols (e.g., Bluetooth®, Bluetooth® Low Energy (BLE), Zigbee®, Z-Wave®, etc.). In some examples, the antenna modules 116 may be referred to as "BLE Antenna Modules (BLEAMs)" when the antenna modules 116 are configured to implement BLE communication. In some examples, the antenna modules 116 communicatively couple to a remote device (e.g., the key fob 110, a mobile device) and measure and/or receive measurements of the signal strength of the signals (e.g., received signal strength indicators) broadcast by the remote device to facilitate determining a distance to and/or a location of the remote device relative to the vehicle 100. Further, in some examples, one or more of the antenna modules 116 are located inside a cabin of the vehicle 100 to determine when a remote device is within the cabin and/or to localize the remote device within the cabin (e.g., to enable passive start of the vehicle 100).

The communication module 114 is communicatively coupled to the antenna modules 116. For example, the communication module 114 is communicatively coupled to the antenna modules 116 to track a distance to and/or a location of a remote device (e.g., the key fob 110, a mobile device) relative to the vehicle 100. The communication module 114 may be referred to as a "BLE Module (BLEM)" when the antenna modules 116 are configured to implement BLE communication. In some examples, the communication module 114 is configured to receive and analyze the signal strength measurements (e.g., received signal strength indicators) between the antenna modules 116 and a remote device. Based on these measurements, the communication module 114 determines a location of the remote device relative to the vehicle 100 to facilitate initiation of one or more vehicle functions. For example, a passive entry function is initiated upon the communication module 114 determining that the remote device is near a vehicle door and/or a passive start function is initiated upon the communication module 114 determining that the remote device is within the cabin of the vehicle 100.

The vehicle 100 of the illustrated example also includes an autonomy unit 118. The autonomy unit 118 is an electronic control unit that is configured to perform autonomous and/or semi-autonomous motive functions for the vehicle 100. For example, the autonomy unit 118 is configured to control performance of autonomous and/or semi-autonomous driving maneuvers of the vehicle 100 based upon, at least in part, data collected by range-detection sensors of the vehicle 100 (e.g., range-detection sensors 620 of FIG. 6). In the illustrated example, the autonomy unit 118 controls performance of autonomous and/or semi-autonomous driving maneuvers for remote park-assist of the vehicle 100.

In the illustrated example, the vehicle 100 also includes a command controller 120. For example, the command controller 120 is configured to identify and process signals collected from the key fob 110 and/or a mobile device of the user 112 by communication module(s) of the vehicle 100 (e.g., the LF modules 106, the receiver-transceiver module 108, the communication module 114, the antenna modules 116).

In operation, the key fob 110 is utilized to initiate remote park-assist and/or other vehicle functions of the vehicle 100. For example, the vehicle 100 of the illustrated example is permitted to autonomously perform motive functions for remote park-assist when the user 112 is within a tethering range 122 of the vehicle 100 and is prohibited from autonomously performing the motive functions when the user 112 is outside of the tethering range 122. For instance, some governments have instituted regulations that require the user 112 be within the tethering range 122 of the vehicle 100 while the vehicle 100 is autonomously performing remote park-assist motive functions. The tethering range 122 of the illustrated example is defined to extend to a predetermined distance (e.g., 6 meters) from an exterior surface of the vehicle 100. The user 112 is within the tethering range 122 of the vehicle 100 if a distance between the user 112 and the exterior surface of the vehicle 100 is less than or equal to the predetermined distance of the tethering range 122.

As used herein, to "tether" refers to authenticating a key fob and/or mobile device and its distance to a vehicle to initiate remote parking for the vehicle. For example, a vehicle is configured to perform remote parking upon receiving instruction(s) to do so from a key fob and/or mobile device that is tethered to the vehicle and is configured to not perform remote parking upon receiving instruction(s) from a key fob and/or mobile device that is untethered from the vehicle. As used herein, a "tethered" device refers to a key fob and/or a mobile device that is enabled to send instructions to a vehicle to perform remote parking. For example, a key fob and/or mobile device is tethered to a vehicle responsive to the key fob and/or mobile device being wirelessly communicatively coupled to the vehicle and located within a predetermined tethering range (e.g., 6 meters) of the vehicle. In such examples, a key fob and/or mobile device that sends instructions to a vehicle to perform remote parking is untethered from the vehicle if the key fob and/or mobile device is beyond the tethering range of the vehicle.

In some examples, a remote park-assist system utilizes both the key fob 110 and a mobile device (a smart phone, a wearable, a smart watch, a tablet, etc.) carried by the user 112 to initiate remote park-assist for the vehicle 100. For example, the command controller 120 utilizes communication with the key fob 110 to determine the distance between the user 112 and the vehicle and utilizes communication with the mobile device for receiving remote park-assist signals from the user 112. The command controller 120 utilizes communication between the key fob 110 and the LF modules 106 and/or the receiver-transceiver module 108 to determine the distance between the vehicle 100 and the key fob 110. For example, the command controller 120 determines the distance between the user 112 and the vehicle 100 based upon low-frequency communication between the key fob 110 and the LF modules 106 rather than the wireless communication with the mobile device, because calculating a distance based upon a received signal strength indicator (RSSI) of low-frequency communication is more accurate than calculating a distance based upon an RSSI of BLE, Wi-Fi, and/or communication signals with similar sample rates. That is, because the key fob 110 has an LF antenna (e.g., an LF antenna 708 of FIG. 7) for low-frequency communication, the command controller 120 utilizes the RSSI of communication with the key fob 110 to approximate a distance between the user 112 and the vehicle 100.

Further, in some examples, the communication between the key fob 110 and the vehicle 100 to determine the distance between the two is asymmetrical. For example, one or more of the LF modules 106 transmits a beacon in the form of a LF signal to prompt the key fob 110 to send a return signal. Upon receiving the beacon from one or more of the LF modules 106, the key fob 110 (e.g., via a processor 702 of FIG. 7) determines a distance indicator (a received signal strength indicator or RSSI) for the received beacon. Further, the key fob 110 (e.g., via the processor 702) includes the distance indicator in the return signal. Subsequently, the receiver-transceiver module 108 receives the return signal from the key fob 110, for example, in the form of a UHF signal and determines the distance between the vehicle 100 and the key fob 110 based on the distance identifier within the return signal. Further, in some examples, the return signal includes an authentication token (e.g., an encrypted identifier, an encrypted counter, etc.) to enable the command controller 120 to determine whether the key fob 110 is authorized for communication with the vehicle 100.

Further, the command controller 120 is configured to utilize communication between the mobile device and the antenna modules 116 and/or the receiver-transceiver module 108 to receive signals for initiating RePA from the user 112. Because the mobile device has antenna(s) for BLE, Wi-Fi, ultra-wideband (UWB), and/or other communication protocol(s), the command controller 120 utilizes the antenna modules 116 and/or the receiver-transceiver module 108 to receive RePA signal(s) from the mobile device via BLE, Wi-Fi, UWB, and/or other communication protocol(s). By utilizing (1) communication with the key fob 110 to determine a distance to the user 112 and (2) communication with the mobile device to receive signals for initiating RePA functions, the command controller 120 is able to simultaneously determine the distance to the user 112 and receiving RePA signals.

Additionally, or alternatively, the key fob 110 of the illustrated example is configured to be utilized for both (1) determining the distance to the user 112 and (2) sending signals to initiate RePA functions. For example, the key fob 110 is configured to send signals to the vehicle 100 to initiate RePA functions upon communicating with the vehicle 100 to determine the distance between the key fob 110 and the vehicle 100. In some examples, the remote park-assist system of the vehicle 100 utilizes the key fob 110 to send RePA signals if the mobile device has been misplaced by the user 112 and/or has a discharged battery. That is, the key fob 110 of the illustrated example is configured to be utilized as a backup remote device for initiating performance of RePA for the vehicle 100. Additionally, or alternatively, the remote park-assist system of the vehicle 100 may utilize the key fob 110 to send RePA signals if the user 112 prefers carrying only a single remote device for initiating performance of RePA for the vehicle 100.

Figure 3:
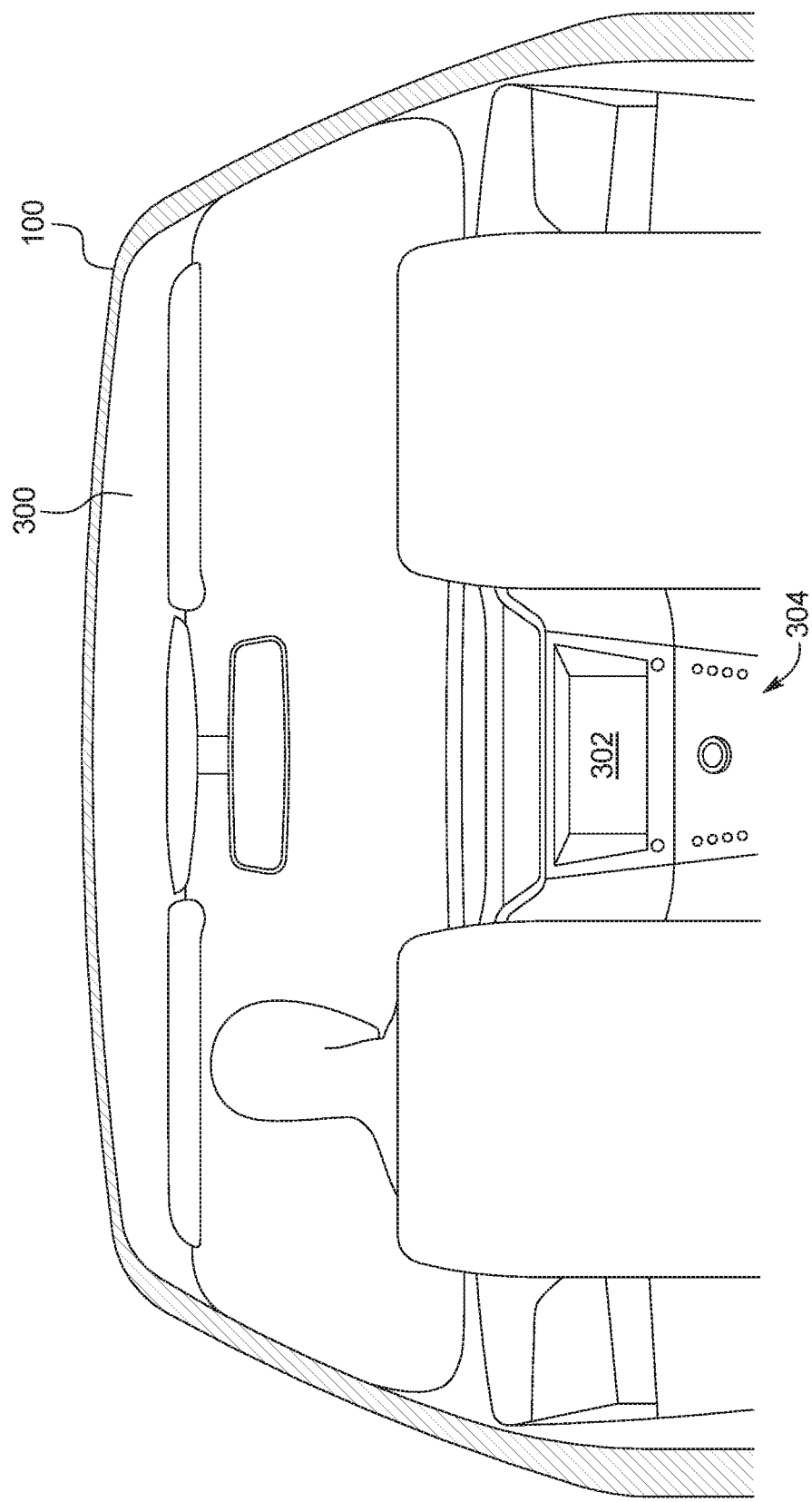
FIG. 3 illustrates a cabin of the vehicle of FIG. 1.
Figure 6:
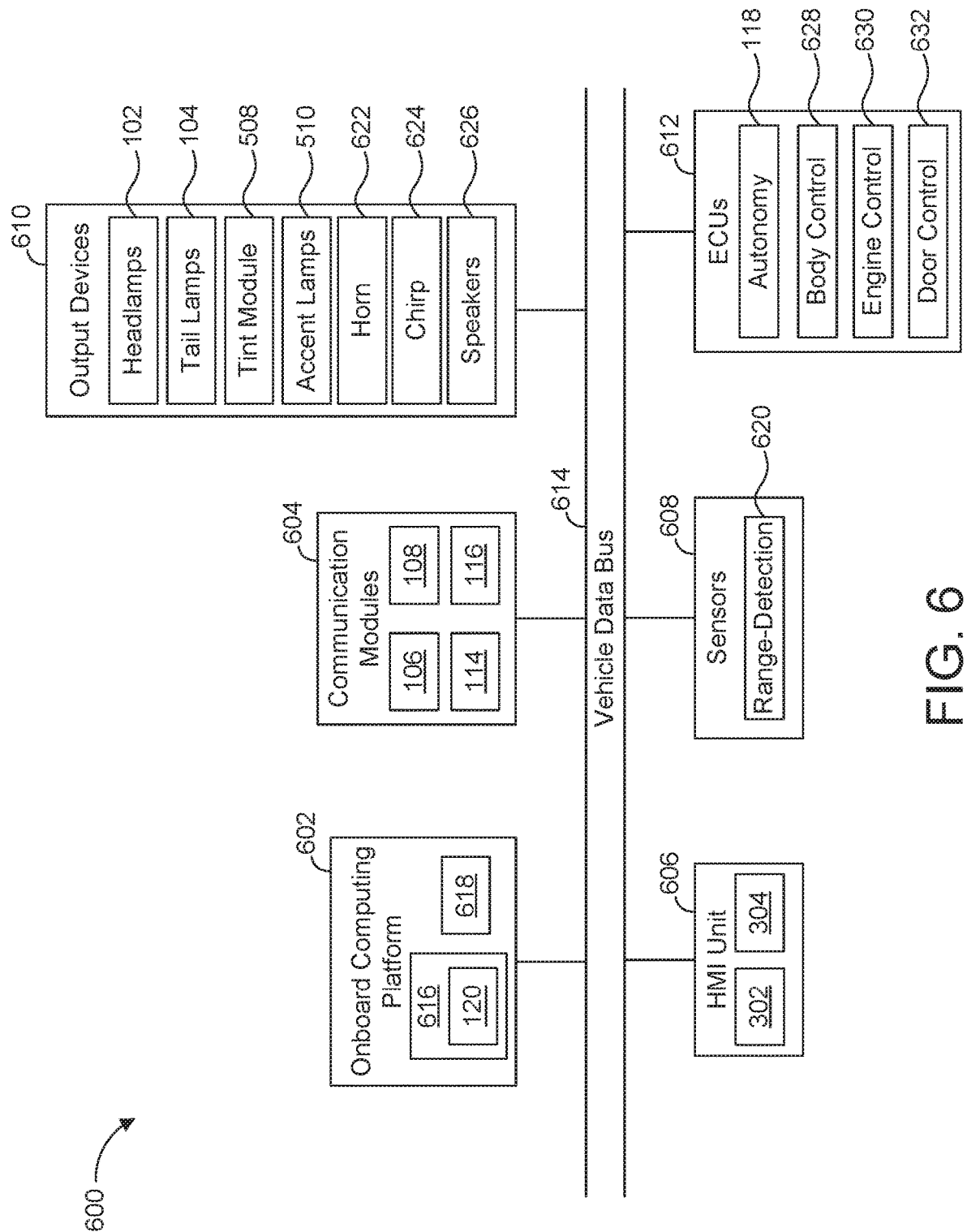
FIG. 6 is a block diagram of electronic components of the vehicle of FIG. 1.

Further, in operation, the command controller 120 is configured to enable the user 112 to activate the RePA system of the vehicle 100 via a human-machine interface (HMI) unit within a cabin of the vehicle 100 (e.g., via an HMI unit 606 of FIG. 6 within a cabin 300 of FIG. 3). For example, the command controller 120 enables the user 112 to activate the RePA system of the vehicle 100 via a touchscreen of the vehicle 100 (e.g., via a display 302 of the FIG. 3). The command controller 120 also is configured to enable the user 112 to select which remote device, such as the key fob 110 or a mobile device (e.g., a smart phone, a wearable, a smart watch, a tablet, etc.), is to be utilized for initiating RePA functions for the vehicle 100. For example, the touchscreen and/or another input device of the HMI unit enables the user 112 to select whether the user 112 will utilize (1) a mobile device for initiating RePA functions or (2) the key fob 110 as a backup RePA device for temporarily initiating RePA functions.

Additionally, or alternatively, the command controller 120 is configured to enable and/or disable performance of RePA once the RePA system is activated. For example, the command controller 120 is configured to enable and/or disable RePA based on a location of the key fob 110. The command controller 120 is configured to temporarily disable RePA in response to determining that the key fob 110 is located within the cabin of the vehicle 100. That is, the command controller 120 is configured to prevent the user 112 from initiating RePA functions from within the cabin of the vehicle 100. The command controller 120 also is configured to temporarily disable RePA in response to determining that the key fob 110 is located beyond the tethering range 122 of the vehicle 100. Further, the command controller 120 is configured to enable RePA in response to determining that the key fob 110 is located both outside of the cabin and within the tethering range 122 of the vehicle 100. Further, in some examples, the command controller 120 is configured to emit an alert to the user 112 via output device(s) of the vehicle 100 and/or the key fob 110 based on a current status of RePA to inform the user 112 regarding the performance of RePA.

Figure 2:
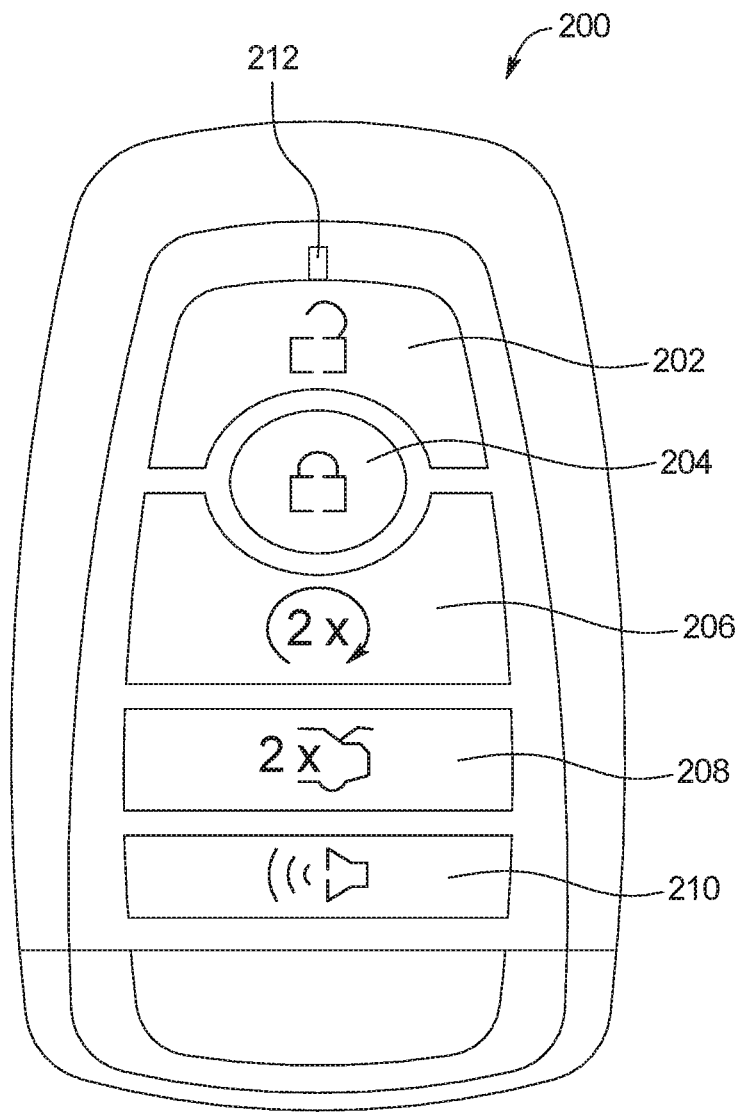
FIG. 2 depicts an example of the key fob of FIG. 1.

FIG. 2 depicts an example key fob 200 in accordance with the teachings herein. That is, the key fob 200 is an example of the key fob 110 of FIG. 1. As illustrated in FIG. 2, the key fob 200 includes a plurality of buttons. For example, the key fob 200 includes an unlock button 202 and a lock button 204.

When the unlock button 202 is pressed by the user 112, the key fob 110 is configured to send an unlock signal to the vehicle 100 to unlock one or more locked doors of the vehicle 100 (e.g., via door control units 632 of FIG. 6). For example, when the unlock button 202 is pressed once, the key fob 110 is configured to send a first unlock signal to the vehicle 100 to unlock the driver's door of the vehicle 100. When the unlock button 202 is pressed twice within a predetermined period of time (e.g., 3 seconds), the key fob 110 is configured to send a second unlock signal to the vehicle 100 to unlock all of the doors of the vehicle 100. Further, in some examples, when the unlock button 202 is held for a predetermined period of time (e.g., 4 seconds), the key fob 110 is configured to send an open signal to the vehicle 100 to open one or more windows of the vehicle 100 (e.g., via the door control units 632).

When the lock button 204 is pressed by the user 112, the key fob 110 is configured to send a lock signal to the vehicle 100 to lock unlocked door(s) of the vehicle 100 (e.g., via the door control units 632). For example, when the lock button 204 is pressed once, the key fob 110 is configured to send a lock signal to the vehicle 100 to lock the doors of the vehicle 100. When the lock button 204 is pressed twice within a predetermined period of time (e.g., 3 seconds), the command controller 120 causes (e.g., via a body control module 628 of FIG. 6) a speaker and/or horn of the vehicle 100 to emit a chirp alert. Further, in some examples, the command controller 120 causes lights to flash upon the first pressing of the lock button 204 and/or the doors locking. Additionally, or alternatively, when the lock button 204 is held for a predetermined period of time (e.g., 4 seconds), the key fob 110 is configured to send a close signal to the vehicle 100 to close one or more windows of the vehicle 100 (e.g., via the door control units 632).

The key fob 200 of the illustrated example also includes a trigger button 206 (sometimes referred to as a "2×" button). The trigger button 206, in combination with the other buttons of the key fob 200, is configured to trigger other vehicle functions of the vehicle 100. For example, when the lock button 204 is pressed once and the trigger button 206 is subsequently pressed twice in succession, the key fob 110 is configured to send a remote-start signal to the vehicle 100 to remote start an engine of the vehicle 100 (e.g., via an engine control unit 630 of FIG. 6). Further, in some examples when remote-start is active, the key fob 110 is configured to send a remote-start stop signal when the trigger button 206 is pressed only once within a predetermined period of time. Additionally, or alternatively, when the unlock button 202 is pressed once and the trigger button 206 is subsequently pressed twice in succession, the key fob 110 is configured to send a RePA signal to the vehicle 100 to initiate RePA for the vehicle 100 (e.g., via the autonomy unit 118).

In the illustrated example, the key fob 200 also includes a hatch button 208, an alert button 210 (sometimes referred to as a panic button), and a lamp 212 (e.g., a light emitting diode or LED). The hatch button 208 (sometimes referred to as a trunk button or a liftgate button) is configured to initiate opening and/or closing a hatch, a liftgate, a deck lid, a trunk, and/or trunk of the vehicle 100. For example, when the hatch button 208 is pressed twice within a predetermined period of time (e.g., 3 seconds), the key fob 110 is configured to send a hatch signal to actuate the hatch of the vehicle 100. When the hatch is closed, the vehicle 100 (e.g., via a body control module 628 of FIG. 6) is to open the hatch upon receiving the hatch signal. Further, in some examples when the hatch is open, the vehicle 100 (e.g., via the body control module 628) is to close the hatch upon receiving the hatch signal. The alert button 210 (sometimes referred to as a panic button) is configured to initiate an alert (e.g., an audio and/or visual alert) of the vehicle 100. For example, when the alert button 210 is pressed by the user 112, the key fob 110 is configured to send alert signal to the vehicle 100 to emit the alert. Further, the lamp 212 is configured to emit alert(s) to the user 112 regarding the status of vehicle function(s) initiated via the key fob 110. For example, the lamp 212 emits different colors (e.g., red, green) and/or a different sequences (e.g., different combinations of dots and dashes) to emit different alerts to the user 112.

FIG. 3 illustrates a cabin 300 of the vehicle 100. In the illustrated example, a display 302 and console input devices 304 are located within the cabin 300 of the vehicle 100. For example, the display 302 and the console input devices 304 are located on a dashboard, a center console, and/or another console of the vehicle 100 that is adjacent to a driver's seat within the cabin 300 to facilitate a vehicle operator (e.g., a driver) in utilizing the display 302 and the console input devices 304.

In the illustrated example, the console input devices 304 include input device(s), such as switches, buttons, etc., that enable the vehicle operator and/or a passenger to control various features of the vehicle 100. Further, the display 302 of the illustrated example includes a center console display, such as a liquid crystal display (LCD), an organic light emitting diode (OLED) display, a flat panel display, a solid state display, etc. Additionally, or alternatively, the display 302 includes a heads-up display that is configured to project an image onto a windshield of the vehicle 100. In some examples, the display 302 is a touchscreen that is configured to receive input information from the user 112. Further, in some examples, the console input devices 304 are configured to receive input information that corresponds with output information being presented via the display 302.

In operation, the command controller 120 is configured to receive an input from the user 112 to activate RePA. For example, the command controller 120 receives a selection to activate RePA from a human-machine interface (e.g., a touchscreen such as the display 302, the console input devices, 304, a cabin microphone, etc.) of a human-machine interface (HMI) unit of the vehicle 100. Subsequently, the command controller 120 is configured to receive a selection of which remote device is to be used by the user 112 for sending RePA signals to the vehicle 100. That is, the command controller 120 receives a selection, via the HMI unit, of whether the user 112 will use a mobile device (a smart phone, a wearable, a smart watch, a tablet, etc.) or the key fob 110 to send RePA instructions. For example, the user 112 may select to use the key fob 110 as a backup RePA device if the mobile device is misplaced and/or discharged.

In response to the receiving a selection of the key fob 110, the command controller 120 is configured to cause the HMI unit to present instructions that inform the user 112 as to how to utilize the key fob 110 to send RePA signals via the key fob 110. For example, the display 302 presents an interface (e.g., an interface 400 of FIG. 4) that includes the instructions and/or speakers (e.g., speakers 626 of FIG. 6) audibly emit the instructions to the user 112.

Further, upon activation, the command controller 120 is configured to enable and/or disable the autonomy unit 118 from performing RePA based on the location of the key fob 110. For example, the command controller 120 is configured to determine whether the key fob 110 is located within the cabin 300, beyond the tethering range 122, or outside of the cabin 300 within the tethering range 122 based on the distance indicator collected from the key fob 110. The command controller 120 is configured to prevent the user 112 from initiating RePA functions responsive to determining that the key fob 110 is located within the cabin of the vehicle 100. The command controller 120 also is configured to temporarily disable RePA in response to determining that the key fob 110 is located beyond the tethering range 122 of the vehicle 100. Further, the command controller 120 is configured to enable RePA in response to determining that the key fob 110 is located both outside of the cabin 300 and within the tethering range 122 of the vehicle 100.

FIG. 4 depict an example interface 400 that is presented via the display 302 of the vehicle 100. As illustrated in FIG. 4, the interface 400 provides instructions to the user 112 regarding how to utilize the key fob 110 for initiating RePA function(s). In some examples, the command controller 120 presents the interface 400 via the display 302 and/or any other display in response to receiving a selection from the user 112 for utilizing the key fob 110 as a backup RePA device. In some examples, the command controller 120 is configured to present the interface 400 via an image sent to the mobile device of the user 112 as a tutorial for use at a later date. Further, in some examples, the command controller 120 is configured to present the interface 400 to the user 112 via an email.

In the illustrated example, the interface 400 includes a fob representation 402 of the key fob 110 and button representations 404 of buttons of the key fob 110. Further, the interface 400 includes symbols 406 that identify non-RePA functions for the buttons of the key fob 110. For example, a button representation of the unlock button 202 includes an unlock symbol to indicate that the unlock button 202 corresponds with an unlock feature, a button representation of the lock button 204 includes a lock symbol to indicate that the lock button 204 corresponds with a lock feature, etc. The interface 400 also includes symbols 408 that identify RePA and/or remote start functions for the buttons of the key fob 110. For example, the symbols indicate that (1) the unlock button 202 corresponds with initiating a forward RePA motion, (2) the lock button 204 corresponds with initiating a reverse RePA motion, (3) the trigger button 206 corresponds with initiating RePA and/or remote start, and (4) the alert button 210 corresponds with initiating a forward and/or reverse RePA motion. Further, in the illustrated example, the interface 400 includes instructions 410 that identify button combination of the key fob 110 for initiating RePA and/or remote start functions (e.g., initiating RePA, initiating a forward motion, initiating a reverse motion, deactivating RePA, etc.).

Figure 5A:
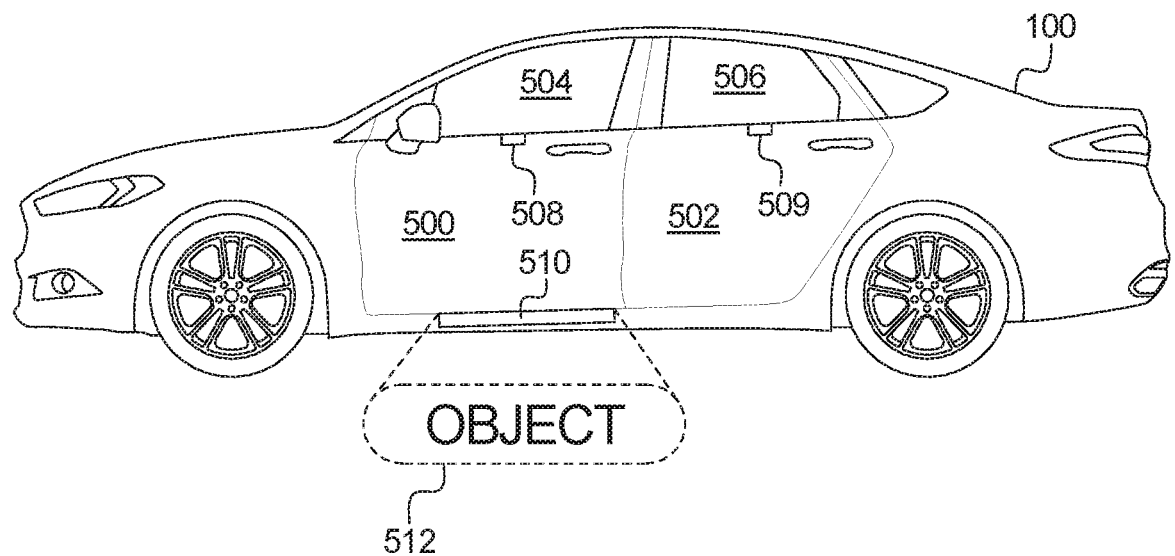
FIG. 5A illustrates accent lamps of the vehicle of FIG. 1 emitting an example alert for remote park-assist.
Figure 5B:
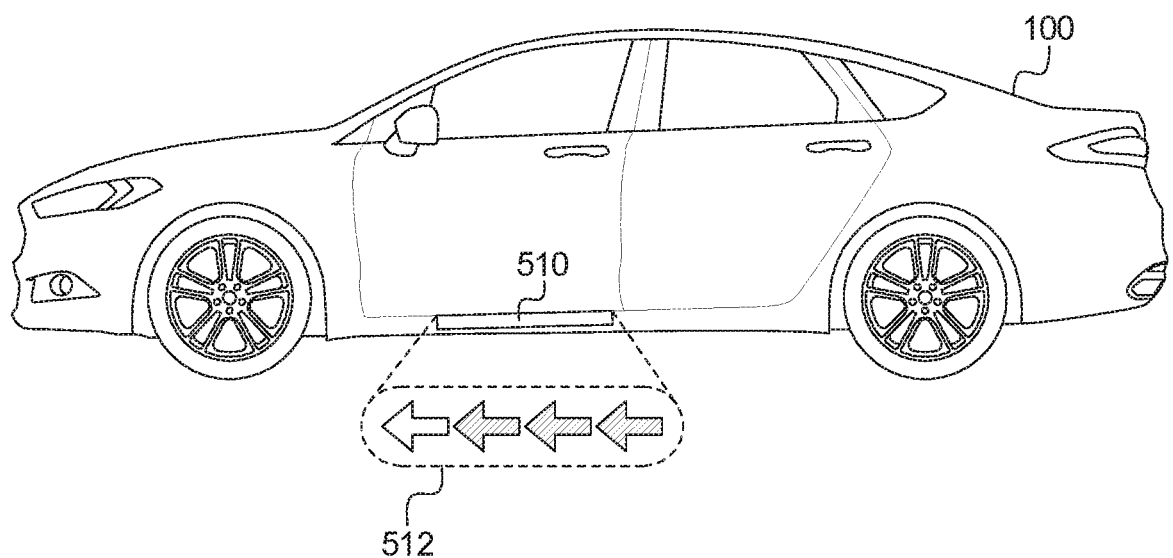
FIG. 5B illustrates the accent lamps of FIG. 5B emitting another example alert for remote park-assist.

FIGS. 5A-5B depict a side view of the vehicle 100. As illustrated in FIG. 5A, the vehicle 100 includes doors 500, 502 and corresponding windows 504, 506. In the illustrated example, each of the windows 504, 506 is an electrochromic window (e.g., a window that includes an electrochromic glazing) that is configured to change light transmission properties when an electric current is applied. In some examples, the windows 504, 506 are fully transparent when no current is applied and become tinted when current is applied. In the illustrated example, a tint module 508 of the door 500 is configured to (1) untint the window 504 by not applying a current to the window 504 when the engine of the vehicle 100 is activated and (2) tint the window 504 by applying a current to the window 504 when the engine is inactive. A tint module 509 of the door 502 is configured to untint the window 506 by not applying a current when the engine is activated and tint the window 506 by not applying a current when the engine is inactive. Further, when RePA is initiated, the command controller 120 is configured to cause the tint module 508 of the door 500 to untint the window 504 (e.g., to enable the user 112 to see that no one is located in the driver's seat).

As illustrated in FIGS. 5A-5B, the vehicle 100 also includes accent lamps 510 that are configured to emit a visual alert 512 on a ground surface adjacent to the vehicle 100. In FIG. 5A, the visual alert 512 emitted by the accent lamps 510 is configured to alert the user 112 that an object is located along a projected travel path of the vehicle 100 during a RePA motive function, for example, by displaying a word or phrase explaining the nature of the visual alert 512. Additionally, or alternatively, the command controller 120 is configured to emit the visual alert 512 to inform the user 112 of other RePA status updates, such as (1) verifying that a transmission of the vehicle 100 is in park, (2) identifying that an ignition is activated upon determining that the ignition was inactive, (3) identifying that an engine is activated upon determining that the engine was inactive, (4) identifying that a steering column is unlocked upon determining that the steering column was locked, (5) identifying that RePA initiation was performed, (6) identifying that RePA initiation was unable to be performed, (7) identifying that RePA cancelation was performed, (8) identifying that RePA cancelation was unable to be performed, (9) identifying that the key fob 110 is being utilized as a backup RePA device, (10) detecting an attempt to initiate RePA from within the cabin 300 of the vehicle 100, (11) detecting that a vehicle door is open, (12) detecting that a brake pedal has been pressed, (13) detecting that an acceleration pedal has been pressed, (14) detecting that movement of a steering wheel has been obstructed, etc.

Further, the accent lamps 510 of the illustrated example are configured to provide other information to the user 112. For example, in FIG. 5B, the visual alert 512 emitted by the accent lamps 510 is configured to inform the user 112 of the travel speed of the vehicle 100 during the RePA motive function. In the illustrated example, the visual alert 512 is an animated alert in which more arrows of the visual alert 512 become illuminated as the vehicle 100 accelerates. Additionally, or alternatively, the command controller 120 is configured to emit an alert to the user 112 regarding the RePA status via other output devices of the vehicle 100 and/or the key fob 110. For example, the command controller 120 is configured to emit a visual alert via the headlamps 102, the tail lamps 104, and/or the display 302. In some examples, the command controller 120 is configured to emit an audio alert via a horn (e.g., a horn 622 and/or a chirp horn 624 of FIG. 6) and/or speakers (e.g., speakers 626 of FIG. 6) of the vehicle 100. In some other examples the command controller 120 is configured to cause speakers to emit verbal alerts and/or explanations (e.g., to further explain the nature of the visual alert 512 to the user 112). Further, in some examples, the command controller 120 is configured to send an instruction to the key fob 110 to emit a visual alert (e.g., via the lamp 212), an audio alert (e.g., via a speaker), and/or a haptic alert (e.g., via a haptic device).

FIG. 6 is a block diagram of electronic components 600 of the vehicle 100. In the illustrated example, the electronic components 600 include an onboard computing platform 602, communication modules 604, a human-machine interface (HMI) 606, sensors 608, output devices 610, electronic control units (ECUs) 612, and a vehicle data bus 614.

The onboard computing platform 602 includes a processor 616 (also referred to as a microcontroller unit and a controller) and memory 618. In the illustrated example, the processor 616 of the onboard computing platform 602 is structured to include the command controller 120. In other examples, the command controller 120 is incorporated into another ECU with its own processor and memory. The processor 616 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 618 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 618 includes multiple kinds of memory, particularly volatile memory and non-volatile memory.

The memory 618 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 618, the computer readable medium, and/or within the processor 616 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The communication modules 604 are configured to wirelessly communicate with the key fob 110 and/or another device. In the illustrated example, the communication modules 604 include the LF modules 106 that are configured for LF communication, the receiver-transceiver module 108 that is configured for UHF and/or other medium-frequency communication, and the communication module 114 and the antenna modules 116 that are configured for BLE communication.

The HMI unit 606 provides an interface between the vehicle 100 and the user 112. The HMI unit 606 includes digital and/or analog interfaces (e.g., input devices and output devices) to receive input from and display information for the user(s). The input devices include the console input devices 304 and/or other input devices, such as a control knob, an instrument panel, a digital camera for image capture and/or visual command recognition, a touchscreen, an audio input device (e.g., cabin microphone), buttons, or a touchpad. The output devices include the display 302 and/or other output device(s), such as instrument cluster outputs (e.g., dials, lighting devices), actuators, etc. In the illustrated example, the HMI unit 606 includes hardware (e.g., a processor or controller, memory, storage, etc.) and software (e.g., an operating system, etc.) for an infotainment system (such as SYNC® and MyFord Touch® by Ford®). Additionally, the HMI unit 606 displays the infotainment system on, for example, the display 302.

The sensors 608 are arranged in and/or around the vehicle 100 to monitor properties of the vehicle 100 and/or an environment in which the vehicle 100 is located. One or more of the sensors 608 may be mounted to measure properties around an exterior of the vehicle 100. Additionally, or alternatively, one or more of the sensors 608 may be mounted inside a cabin of the vehicle 100 or in a body of the vehicle 100 (e.g., an engine compartment, wheel wells, etc.) to measure properties in an interior of the vehicle 100. For example, the sensors 608 include accelerometers, odometers, tachometers, pitch and yaw sensors, wheel speed sensors, microphones, tire pressure sensors, biometric sensors and/or sensors of any other suitable type.

In the illustrated example, the sensors 608 include range-detection sensors 620. As used herein, a "range-detection sensor" refers to an electronic device that is configured to collect information to detect a presence of and distance to nearby object(s). In the illustrated example, the range-detection sensors 620 include proximity sensors and/or cameras. The proximity sensors are configured to detect the presence, proximity, and/or location of object(s) near the vehicle 100. For example, the proximity sensors include radar sensor(s), LIDAR sensor(s), ultrasonic sensor(s), and/or any other sensor configured to detect the presence, proximity, and/or location of nearby object(s). A radar sensor detects and locates an object via radio waves, a LIDAR sensor detects and locates the object via lasers, and an ultrasonic sensor detects and locates the object via ultrasound waves. Further, the cameras are configured to capture image(s) and/or video of a surrounding area of the vehicle 100 to enable nearby object(s) to be identified and located. In the illustrated example, the range-detection sensors 620 are located along the vehicle 100 to enable the range-detection sensors 620 to monitor a surrounding area of the vehicle 100. For example, the range-detection sensors 620 monitor the surrounding area of the vehicle 100 to enable the autonomy unit 118 to perform autonomous motive functions for the vehicle 100.

The output devices 610 provide an interface for the vehicle 100 to present information to the user 112 and/or others nearby. The output devices 610 may include digital interface(s) and/or analog interface(s). In some examples, one or more of the output devices 610 are located within the cabin 300 of the vehicle 100. For example, the output devices 610 include instrument cluster output(s) and/or the display 302. Additionally, or alternatively, one or more of the output devices 610 are located along an exterior of the vehicle 100 outside of the cabin 300. In the illustrated example, the output devices 610 include the headlamps 102, the tail lamps 104, the tint module 508, the accent lamps 510, a horn 622, a chirp horn 624, and speakers 626. Further, in the illustrated example, one or more of the output devices 610 are configured to emit an alert to the user 112 based on a current status of RePA for the vehicle 100. For example, the headlamps 102, the tail lamps 104, the tint module 508, the accent lamps 510, the horn 622, the chirp horn 624, and/or the speakers 626 are configured to emit an audio and/or visual alert to the user 112 based on a current RePA status.

The ECUs 612 monitor and control the subsystems of the vehicle 100. For example, the ECUs 612 are discrete sets of electronics that include their own circuit(s) (e.g., integrated circuits, microprocessors, memory, storage, etc.) and firmware, sensors, actuators, and/or mounting hardware. The ECUs 612 communicate and exchange information via a vehicle data bus (e.g., the vehicle data bus 614). Additionally, the ECUs 612 may communicate properties (e.g., status of the ECUs 612, sensor readings, control state, error and diagnostic codes, etc.) to and/or receive requests from each other. For example, the vehicle 100 may have dozens of the ECUs 612 that are positioned in various locations around the vehicle 100 and are communicatively coupled by the vehicle data bus 614. In the illustrated example, the ECUs 612 include the autonomy unit 118, a body control module 628, an engine control unit 630, and one or more door control units 632.

The autonomy unit 118 controls performance of autonomous and/or semi-autonomous driving maneuvers of the vehicle 100 (e.g., for remote park-assist) based upon, at least in part, data collected by the range-detection sensors 620 of the vehicle 100. The body control module 628 controls one or more subsystems throughout the vehicle 100, such as an immobilizer system, etc. For example, the body control module 628 includes circuits that drive one or more of relays (e.g., to control wiper fluid, etc.), brushed direct current (DC) motors (e.g., to control power seats, wipers, etc.), stepper motors, LEDs, etc. Further, the engine control unit 630 controls operation of an engine (e.g., an internal combustion engine, an electric motor, a hybrid engine) of the vehicle 100. For example, the engine control unit 630 is configured to remote start the engine upon receiving a signal to do so.

The door control units 632 control one or more subsystems located on doors (e.g., a driver door, a passenger door, a hatch and/or trunk, etc.) of the vehicle 100. For example, each door of the vehicle 100 includes a respective one of the door control units 632. Each of the door control units 632 includes circuits that drive relay(s), brushed DC motor(s), stepper motor(s), LEDs, etc. for the operation of power windows, power locks, power mirrors, etc. for the respective door of the vehicle 100.

In some examples, each of door control units 632 is communicatively coupled to an electronic latch (also referred to as an e-latch) of the respective door. The e-latch is an electromechanical device that actuates a door latch to latch and/or unlatch the door. For example, the lock state is stored in memory of one or more of the door control units 632 and/or the body control module 628. Further, the e-latch is utilized for a remote entry system and/or a passive entry system of the vehicle 100. For a remote entry system, one or more of the door control units 632 instructs a respective e-latch to (1) place the latch memory in an unlock state for the respective door in response to the command controller 120 receiving an unlock signal from the key fob 110 and/or (2) lock the respective door in response to the command controller 120 receiving a lock signal from the key fob 110. For a passive entry system, one or more of the door control units 632 primes a respective e-latch of the respective door for unlocking in response to the command controller 120 detecting that the key fob 110 is located within a predetermined distance of the vehicle 100. Subsequently, the e-latch actuates a door latch to unlatch the respective door in response to detecting that a door handle of the door is being grasped by the user 112. In some examples, one of the door control units 632 corresponds with a hatch and/or trunk of the vehicle 100. That one of the door control units 632 is configured to open and/or close the hatch and/or trunk in response to the command controller 120 receiving a signal to do so from the key fob 110.

The vehicle data bus 614 communicatively couples the onboard computing platform 602, the communication modules 604, the HMI unit 606, the sensors 608, the output devices 610, and the ECUs 612. In some examples, the vehicle data bus 614 includes one or more data buses. The vehicle data bus 614 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc. In some examples, the vehicle data bus 614 includes a wireless communication network (e.g., WiFi or Bluetooth).

Figure 7:
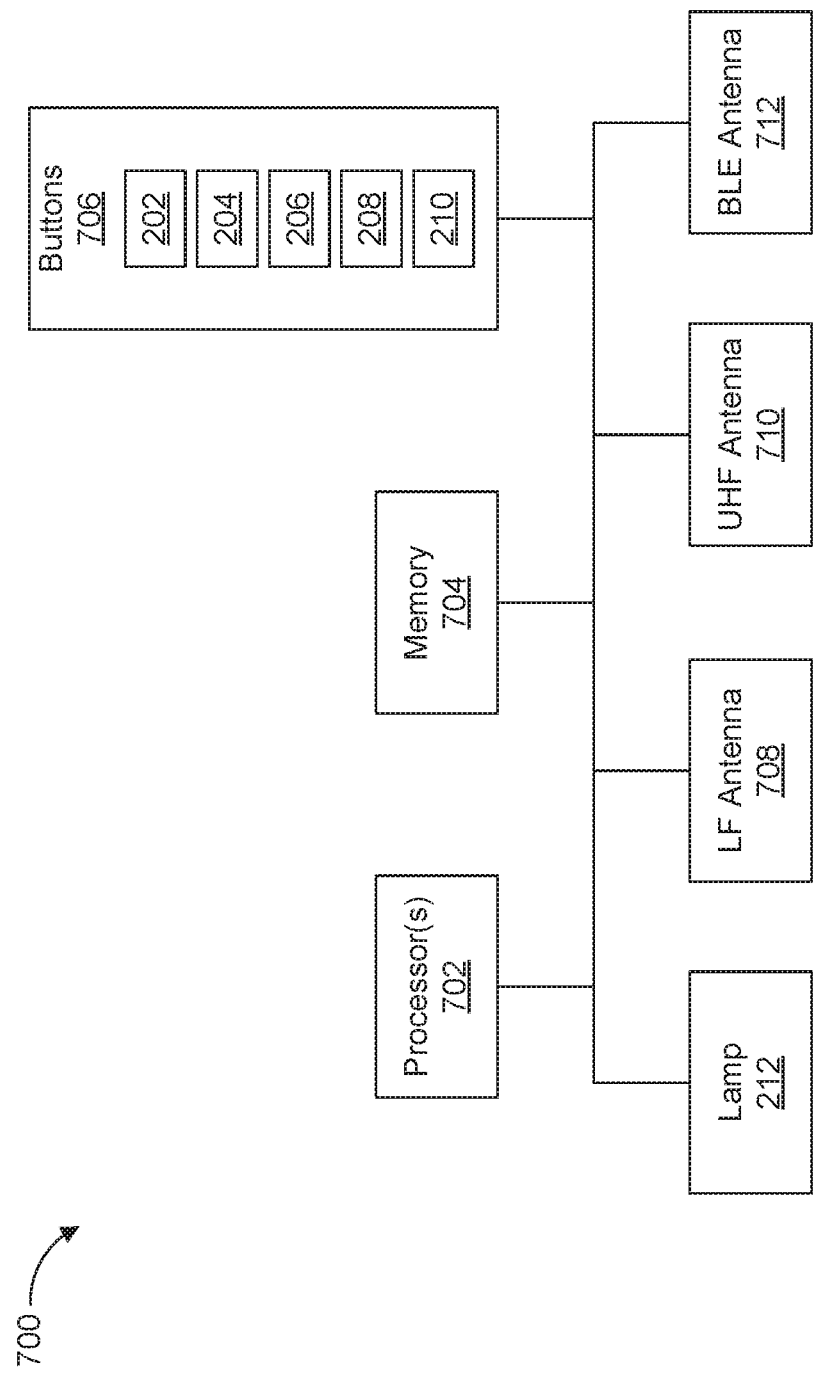
FIG. 7 is a block diagram of electronic components of the key fob of FIG. 1.

FIG. 7 is a block diagram of electronic components 700 of the key fob 110 (e.g., the key fob 200). In the illustrated example, the electronic components 700 include a processor 702, memory 704, buttons 706, the lamp 212, an LF antenna 708, and a UHF antenna 710.

In the illustrated example, the processor 702 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 704 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 704 includes multiple kinds of memory, particularly volatile memory and non-volatile memory.

The memory 704 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 704, the computer readable medium, and/or within the processor 702 during execution of the instructions.

The buttons 706 of the illustrated example are input devices that are configured to receive input information from the user 112 of the vehicle 100. For example, one or more of the buttons 706 are configured to receive requests for remote entry, remote start, unlocking and/or locking a door, opening and/or closing a hatch and/or trunk, emitting an alert, opening and/or closing a door window, remote park-assist, etc. In the illustrated example, the buttons 706 include the unlock button 202, the lock button 204, the trigger button 206, the hatch button 208, and the alert button 210. Further, the lamp 212 (e.g., an LED) of the illustrated example is an output device that is configured to provide output information to the user 112 of the vehicle 100. For example, the lamp 212 is configured to provide output information regarding remote entry, remote start, unlocking and/or locking a door, opening and/or closing a hatch and/or trunk, emitting an alert, opening and/or closing a door window, remote park-assist, etc.

The LF antenna 708 of the illustrated example includes hardware (e.g., processors, memory, storage, antenna, etc.) and software to communicate via LF signals (e.g., 125 kHz to 134.5 kHz, etc.). For example, the LF antenna 708 is configured to receive a beacon message that is transmitted by one or more of the LF modules 106 of the vehicle 100. Further, the processor 702 is configured to identify a distance that the beacon message has traveled based on characteristics of the beacon message.

The UHF antenna 710 of the illustrated example is configured to include hardware and software to communicate via ultra-high frequency (UHF) signals and/or other medium-frequency signals (e.g., 314 MHz to 904 MHz, etc.). For example, the UHF antenna 710 is configured to transmit a return signal to the receiver-transceiver module 108 of the vehicle 100. In some examples, the processor 702 includes a corresponding distance indicator (e.g., a received signal strength indicator) in the return signal to enable the receiver-transceiver module 108 to identify the distance between the vehicle 100 and the key fob 110. Further, the UHF antenna 710 is configured to transmit an unlock signal, a lock signal, a remote start signal, a RePA signal, and/or any other signal that corresponds with a predefined sequence of fob buttons (e.g., the buttons 202, 204, 206, 208, 210) pressed by the user 112.

Further, in some examples, the electronic components 700 of the key fob 110 also include a BLE antenna 712 to enable the key fob 110 to communicate with the vehicle 100 via BLE communication. For example, the BLE antenna 712 includes hardware and software to communicate via BLE signals. In such examples, the BLE antenna 712 is configured to transmit an unlock signal, a lock signal, a remote start signal, a RePA signal, and/or any other signal that corresponds with a predefined sequence of fob buttons (e.g., the buttons 202, 204, 206, 208, 210) pressed by the user 112. Further, in some examples, UWB or Wi-Fi communication and time-of-flight methodologies are utilized in lieu of or in addition to BLE communication for estimating a distance between the key fob 110 and the vehicle 100. Additionally, or alternatively, BLE communication and time-of-flight methodologies (e.g., instead of received signal strength indicators) are implemented by the key fob 110 and the vehicle 100 to determine the distance between the two.

Figure 8:
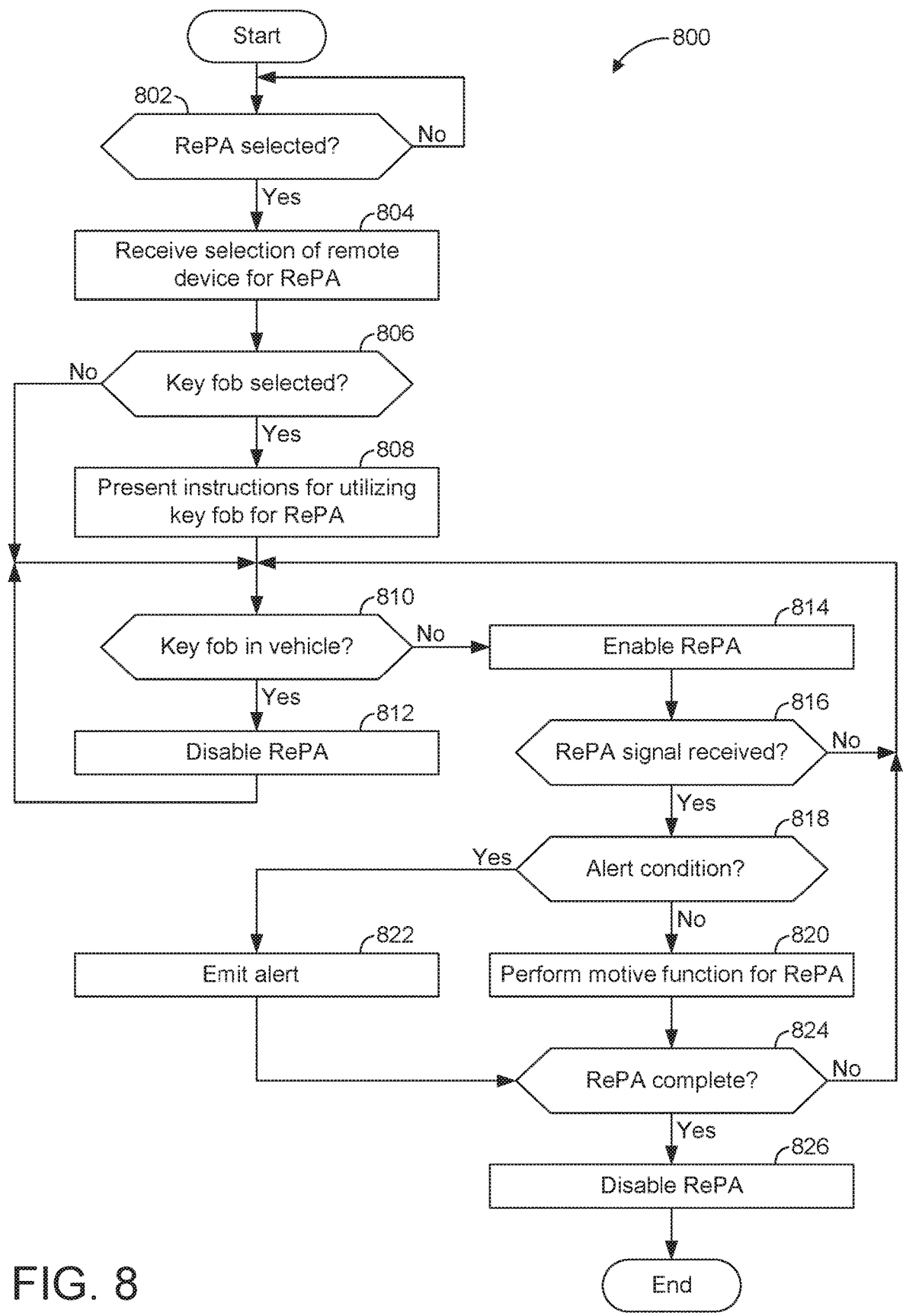
FIG. 8 is a flowchart for initiating remote park-assist for vehicle with a key fob in accordance with the teachings herein.

FIG. 8 is a flowchart of an example method 800 to initiate remote park-assist for a vehicle via a key fob. The flowchart of FIG. 8 is representative of machine readable instructions that are stored in memory (such as the memory 618 of FIG. 6 and/or the memory 704 of FIG. 7) and include one or more programs which, when executed by a processor (such as the processor 616 of FIG. 6 and/or the processor 702 of FIG. 7), cause the key fob 110 and/or the vehicle 100 to perform the method 800. While the example program is described with reference to the flowchart illustrated in FIG. 8, many other methods for initiating remote park-assist and other vehicle functions via a key fob may alternatively be used. For example, the order of execution of the blocks may be rearranged, changed, eliminated, and/or combined to perform the method 800. Further, because the method 800 is disclosed in connection with the components of FIGS. 1-7, some functions of those components will not be described in detail below.

Initially, at block 802, the command controller 120 determines whether the user 112 has selected to activate RePA. For example, the command controller 120 receives a selection from the user 112 to activate RePA from the HMI unit 606 of the vehicle 100 or a mobile device. In response to the command controller 120 determining that activation of RePA has not been selected, the method 800 returns to block 802. Otherwise, in response to the command controller 120 determining that activation of RePA has been selected, the method 800 proceeds to block 804.

At block 804, the command controller 120 receives a selection of a remote device that is to be used by the user 112 for sending RePA signals to the vehicle 100 from a remote location. That is, the command controller 120 receives a selection of which mobile device or key fob (e.g., the key fob 110) is to be utilized for initiating RePA functions. For example, the command controller 120 receives a selection of the remote device from the HMI unit 606 of the vehicle 100. At block 806, the command controller 120 determines whether the key fob 110 of the user 112 was selected to be utilized as a backup RePA device. In response to the command controller 120 determining that the key fob 110 was not selected (e.g., that the mobile device of the user 112 was selected), the method 800 proceeds to block 810. Otherwise, in response to the command controller 120 determining that the key fob 110 was selected, the method proceeds to block 808 at which the HMI unit 606 (e.g., the display 302) presents instructions that inform the user 112 as to how to utilize the key fob 110 to send RePA signals via the key fob 110. In some examples, the command controller 120 causes the instructions to be sent to a mobile device of the user 112.

At block 810, the command controller 120 determines whether the key fob 110 of the user 112 is located within the cabin 300 of the vehicle 100. For example, the command controller 120 determines whether the key fob 110 is in the cabin 300 based on a distance indicator (e.g., a received signal strength indicator) that is determined based on communication between the vehicle 100 and the key fob 110. In response to the command controller 120 determining that the key fob 110 is located in the cabin 300, the method proceeds to block 812 at which the command controller 120 disables RePA while the key fob 110 remains in the cabin 300. Otherwise, in response to the command controller 120 determining that the key fob 110 is not located in the cabin 300, the method proceeds to block 814 at which the command controller 120 enables RePA to be performed. For example, the command controller 120 enables RePA to be performed in response to determining that the key fob 110 is within the tethering range 122 outside the cabin 300 of the vehicle 100.

At block 816, the command controller 120 determines whether a RePA signal has been received from the key fob 110. For example, the receiver-transceiver module 108, the communication module 114, and/or the antenna modules 116 of the vehicle 100 receive the RePA signal from the key fob 110. In response to the command controller 120 determining that a RePA signal has not been received, the method 800 returns to block 810. Otherwise, in response to the command controller 120 determining that a RePA signal has been received, the method 800 proceeds to block 818.

At block 818, the command controller 120 determines whether an alert condition for RePA is present. For example, the command controller 120 detects an alert condition for RePA in response to (1) verifying that a transmission of the vehicle 100 is in park, (2) identifying that an ignition is activated upon determining that the ignition was inactive, (3) identifying that an engine is activated upon determining that the engine was inactive, (4) identifying that a steering column is unlocked upon determining that the steering column was locked, (5) identifying that RePA initiation was performed, (6) identifying that RePA initiation was unable to be performed, (7) identifying that RePA cancelation was performed, (8) identifying that RePA cancelation was unable to be performed, (9) identifying that the key fob 110 is being utilized as a backup RePA device, (10) detecting the presence of an object (e.g., the user 112) along a projected travel path of the vehicle, (11) detecting an attempt to initiate RePA from within the cabin 300 of the vehicle 100, (12) detecting that a vehicle door is open, (13) detecting that a brake pedal has been pressed, (14) detecting that an acceleration pedal has been pressed, (15) detecting that movement of a steering wheel has been obstructed, etc. In response to the command controller 120 determining that an alert condition for RePA is not present, the method 800 proceeds to block 820 at which the autonomy unit 118 autonomously performs a motive function for RePA based on the received RePA signal. Otherwise, in response to the command controller 120 determining that an alert condition for RePA is present, the method 800 proceeds to block 822 at which the command controller 120 emits an alert to the user 112 via one or more of the output devices 610 of the vehicle 100 and/or one or more output devices of the key fob 110 (e.g., the lamp 212).

At block 824, the command controller 120 determines whether a RePA session for the vehicle 100 is complete. For example, the command controller 120 determines that the RePA session is complete in response to (1) receiving an end-RePA signal from the key fob 110 and/or (2) not receiving a RePA signal for at least a predefined period of time. In response to the command controller 120 determining that the RePA session is not complete, the method 800 returns to block 810. Otherwise, in response to the command controller 120 determining that the RePA session is complete, the method 800 proceeds to block 826 at which the command controller 120 disables RePA. Upon completing block 826, the method 800 ends.

An example disclosed vehicle includes a cabin, a human-machine interface (HMI) unit located in the cabin, and a receiver-transceiver module. The receiver-transceiver module is configured to receive a return signal including a distance indicator from a key fob and a remote park-assist (RePA) signal. The example disclosed vehicle also includes an autonomy unit configured to perform RePA based on the RePA signal. The example disclosed vehicle also includes a controller configured to receive, via the HMI unit, selections to activate RePA and utilize the key fob for transmitting the RePA signal and determine, based on the distance indicator, whether the key fob is in the cabin. The controller also is configured to, responsive to determining that the key fob is in the cabin, prevent the autonomy unit from performing RePA.

Some examples further include a low-frequency (LF) module to transmit a beacon. In some such examples, the receiver-transceiver module is configured to receive the return signal upon the LF module transmitting the beacon.

In some examples, the controller is configured to enable the autonomy unit to perform RePA responsive to determining that the key fob is within a predefined tethering distance outside the cabin. In some such examples, when RePA is enabled, the autonomy unit is configured to perform RePA based on the RePA signal.

In some examples, the HMI unit includes a display that is configured to present instructions for utilizing the key fob for RePA responsive to the controller receiving the selection to utilize the key fob for transmitting the RePA signal. In some such examples, the instructions presented via the display identify button combinations of the key fob for initiating a forward motion, initiating a reverse motion, and deactivating RePA. In some such examples, the display is configured to present an alert based on a RePA status. In some such examples, the display includes a touchscreen. Further, in some such examples, the controller is configured to receive the selections via the touchscreen.

In some examples, the controller is configured to emit an audio alert based on a RePA status via at least one of a horn, a chirp horn, and a speaker. In some examples, the controller is configured to emit a visual alert based on a RePA status via exterior lamps. In some such examples, the exterior lamps include accent lamps and the visual alert includes an animated alert. In some examples, the controller is configured to send an instruction to the key fob to emit an alert via an LED of the key fob.

Some examples further include a driver's door that includes an electrochromic window. In some such examples, the controller is configured to de-tint the electrochromic window when RePA is initiated.

An example disclosed method for initiating remote park-assist (RePA) for a vehicle includes receiving, via a human-machine interface (HMI) unit located in a cabin, selections to activate RePA and utilize a key fob for transmitting a RePA signal. The example disclosed method also includes receiving, via a receiver-transceiver module, a return signal from the key fob and identifying, via a processor, a distance indicator within the return signal. The example disclosed method also includes determining, via the processor, whether the key fob is in the cabin based on the distance indicator and preventing an autonomy unit from performing RePA responsive to determining that the key fob is in the cabin.

Some examples further include transmitting a beacon via a low-frequency (LF) module to prompt the key fob to transmit the return signal. Some examples further include enabling the autonomy unit to perform RePA responsive to determining that the key fob is within a predefined tethering distance outside the cabin and performing RePA via the autonomy unit based on the RePA signal when RePA is enabled. Some examples further include, responsive to the controller receiving the selection to utilize the key fob, presenting instructions via a display of the HMI unit for utilizing the key fob for RePA.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a cabin;
   a human-machine interface (HMI) unit located in the cabin;
   a receiver-transceiver module configured to receive:
      a return signal including a distance indicator from a key fob; and
      a remote park-assist (RePA) signal from the key fob, the RePA signal associated with a combination of two or more button selections of the key fob, the RePA signal indicative of one or more vehicle movements;
   an autonomy unit configured to perform the RePA based on the RePA signal;
   a driver's door that includes an electrochromic window; and
   a controller configured to:
      receive, via the HMI unit, selections to activate the RePA and utilize the key fob for transmitting the RePA signal;
      de-tint the electrochromic window when the RePA is initiated;
      determine, based on the distance indicator, whether the key fob is in the cabin; and
      responsive to determining that the key fob is in the cabin, prevent the autonomy unit from performing the RePA.

2. The vehicle of claim 1, further including a low-frequency (LF) module to transmit a beacon.

3. The vehicle of claim 2, wherein the receiver-transceiver module is configured to receive the return signal upon the LF module transmitting the beacon.

4. The vehicle of claim 1, wherein the controller is configured to enable the autonomy unit to perform the RePA responsive to determining that the key fob is within a predefined tethering distance outside the cabin.

5. The vehicle of claim 4, wherein, when the RePA is enabled, the autonomy unit is configured to perform the RePA based on the RePA signal.

6. The vehicle of claim 1, wherein the HMI unit includes a display that is configured to present instructions for utilizing the key fob for the RePA responsive to the controller receiving the selection to utilize the key fob for transmitting the RePA signal.

7. The vehicle of claim 6, wherein the instructions presented via the display identify button combinations of the key fob for activating the RePA, initiating a forward motion, initiating a reverse motion, and deactivating the RePA.

8. The vehicle of claim 6, wherein the display is configured to present an alert based on a RePA status.

9. The vehicle of claim 6, wherein the display includes a touchscreen.

10. The vehicle of claim 9, wherein the controller is configured to receive the selections via the touchscreen.

11. The vehicle of claim 1, wherein the controller is configured to emit an audio alert based on a RePA status via at least one of a horn, a chirp horn, and a speaker.

12. The vehicle of claim 1, wherein the controller is configured to emit a visual alert based on a RePA status via exterior lamps.

13. The vehicle of claim 12, wherein the exterior lamps include accent lamps and the visual alert includes an animated alert.

14. The vehicle of claim 1, wherein the controller is configured to send an instruction to the key fob to emit an alert via an LED of the key fob.

15. A method for initiating remote park-assist (RePA) for a vehicle, the method comprising:
receiving, via a human-machine interface (HMI) unit located in a cabin of the vehicle, selections to activate the RePA and utilize a key fob for transmitting a RePA signal, the RePA signal associated with a combination of two or more button selections of the key fob, the RePA signal indicative of one or more vehicle movements;
receiving, via a receiver-transceiver module, a return signal from the key fob;
de-tinting an electrochromic window on a driver's door when the RePA is initiated;
identifying, via a processor, a distance indicator within the return signal;
determining, via the processor, whether the key fob is in the cabin based on the distance indicator; and
preventing the autonomy unit from performing the RePA responsive to determining that the key fob is in the cabin.

16. The method of claim 15, further including transmitting a beacon via a low-frequency (LF) module to prompt the key fob to transmit the return signal.

17. The method of claim 15, further including enabling the autonomy unit to perform the RePA responsive to determining that the key fob is within a predefined tethering distance outside the cabin and performing the RePA via the autonomy unit based on the RePA signal when the RePA is enabled.

18. The method of claim 15, further including, responsive to receiving the selection to utilize the key fob, presenting instructions via a display of the HMI unit for utilizing the key fob for the RePA.

* * * * *